C. F. WASSERFALLEN.
TIRE RIM CARRIER.
APPLICATION FILED OCT. 29, 1917.

1,384,222.

Patented July 12, 1921.
2 SHEETS—SHEET 1.

Fig. 1.

Witness
Charles Balg
Arthur F. Draper

Inventor
Charles F. Wasserfallen.
By
Attorneys

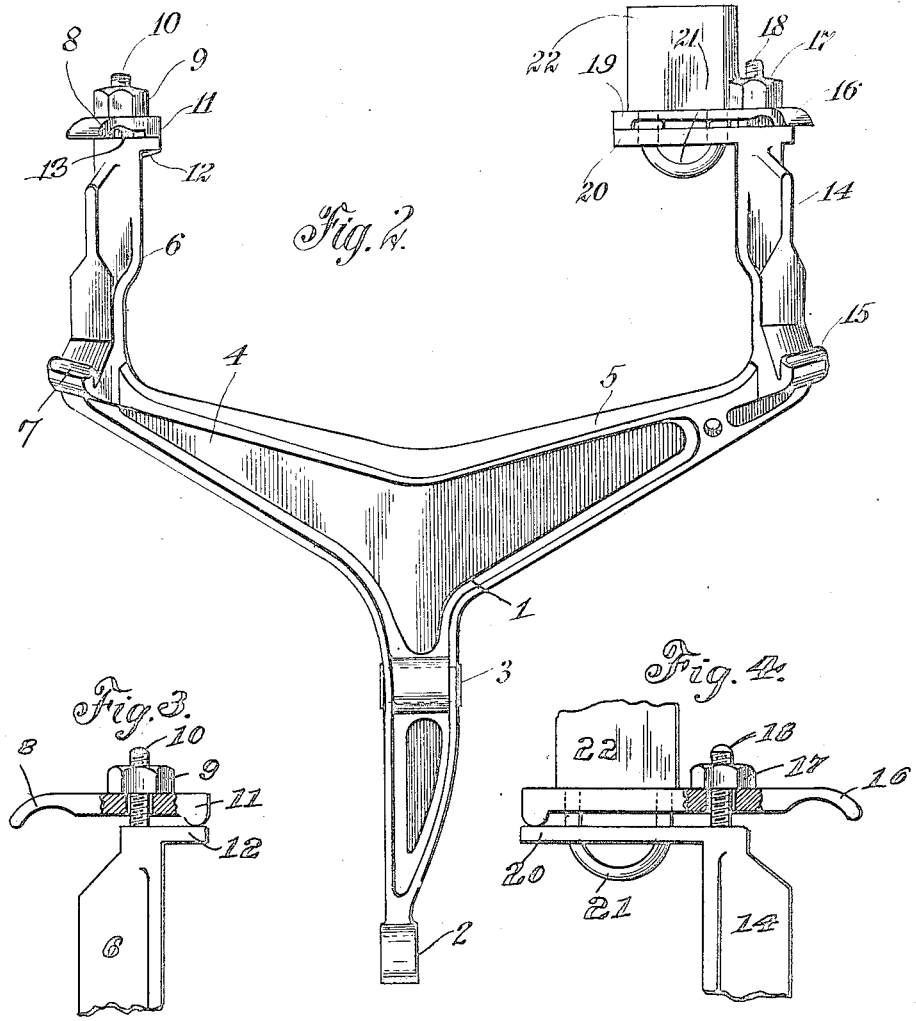

UNITED STATES PATENT OFFICE.

CHARLES F. WASSERFALLEN, OF DETROIT, MICHIGAN, ASSIGNOR TO DETROIT TIRE CARRIER CO., OF DETROIT, MICHIGAN, A CORPORATION OF MICHIGAN.

TIRE-RIM CARRIER.

1,384,222.  Specification of Letters Patent.  Patented July 12, 1921.

Application filed October 29, 1917. Serial No. 199,154.

*To all whom it may concern:*

Be it known that I, CHARLES F. WASSERFALLEN, a citizen of the United States of America, residing at Detroit, in the county of Wayne and State of Michigan, have invented certain new and useful Improvements in Tire-Rim Carriers, of which the following is a specification, reference being had therein to the accompanying drawings.

This invention relates to spare rim or spare wheel carriers for vehicles and to an arrangement thereof that permits the locking of the parts in place so as to prevent the removal of the wheel, while the device is sightly and does not obstruct access to the rear of the vehicle when the wheel spare rim is removed.

The invention consists in the matters hereinafter set forth, and more particularly pointed out in the appended claims.

In the drawings,

Figure 1 is a view in elevation of a wheel supported on a device which embodies features of the invention;

Fig. 2 is a view in detail of one of the brackets of the device.

Fig. 3 is a detail view, partly in elevation and partly in section of the extension at the left of Fig. 2 with the clamping member in position.

Fig. 4 is a similar view of the extension at the right of Fig. 2.

As herein shown a pair of oppositely disposed brackets are each formed with a ribbed and flanged T shaped body 1 the stem of which is provided with openings 2 and 3 whereby it may be secured to the frame of the car. The head of the body has oppositely disposed slightly inclined arms 4 and 5. An extension 6 of the arm 4 on the opposite side from the shank of the body has an inner undercut lug 7 adapted to hook over a tire rim and an outer clamping member 8 that is secured by a binding nut 9 engaging on a stud 10 of the extension, the outer end portion 11 of the clamp forming a foot that rests on a lug 12 of the extension and allows the clamp to rock thereon. The inner face 13 of the clamp is arranged to coöperate with the lug 7 to secure a rim between them. An extension 14 on the arm 5 has a lug 15 corresponding to the lug 7 and a clamping member 16 held by a binding nut 17 engaging the stud 18 of the extension. The clamp 16 coöperates with the lug 15 in holding the applied rim in position.

Preferably the inner end portion 19 of the clamp 16 is extended to mate with a correspondingly extended projection 20 of the stem on which the clamp rocks, the mating parts being apertured to receive the part 21 of a padlock 22 which is thereby secured in such relation to the nut 17 as to prevent removal or rotation of the latter.

The lugs 7 and 15 with their companion clamps 8 and 16 are arranged to engage on the inner periphery of a rim 23 as indicated in Fig. 1, and are therefore set in such relation to each other as to be substantially in concentric relation to the axial center of such applied wheel or rim. Therefore, the lugs 7 and 15 with their corresponding clamps 8 and 16 are obliquely disposed to each other.

As a result of this construction a very effective device is obtained for securely holding a spare wheel or rim in position by means which prevent surreptitious removal as the locking device holds the parts from molestation.

Obviously, changes in the details of construction may be made without departing from the spirit of my invention, and I do not care to limit my self to any particular form or arrangement of parts.

What I claim is:—

1. As a means for supporting spare tires, a pair of independent devices secured to the vehicle at points to locate the devices in position to receive a spare tire or rim with the devices positioned at substantially diametrically-opposite points of the rim, each device comprising a bracket adapted to be secured to the vehicle body and having oppositely-disposed arms, said arms each carrying a lateral extension integral therewith, said extensions being spaced apart in the direction of length of the rim to be carried, an integral rim lug carried at the base of each extension, each extension also having its end formed with an integral member projecting therefrom at substantial right angles to the direction of length of the arm and opposite to that of the rim lug, an element projecting from the end of the arm and forming a continuation thereof, a detachable clamping member mounted on said element and supported by the integral member to engage the opposite side of the tire or rim, and means carried by the element to retain the clamping member in clamping position.

2. Means as in claim 1 characterized in that the clamping member has a formation to fulcrum upon the projecting member of the arm.

3. Means as in claim 1 characterized in that the projecting member of an arm and its companion clamping member are provided with alined openings to receive an element of a locking device.

In testimony whereof I affix my signature in the presence of two witnesses.

CHARLES F. WASSERFALLEN.

Witnesses:
 ANNA M. DORR,
 G. E. McGRANN.